US009297632B2

(12) United States Patent
Godin et al.

(10) Patent No.: US 9,297,632 B2
(45) Date of Patent: Mar. 29, 2016

(54) METHOD FOR ESTIMATING A ROUGHNESS OF A SURFACE

(71) Applicant: COMMISSARIAT A L'ENERGIE ATOMIQUE ET AUX ENE ALT, Paris (FR)

(72) Inventors: Christelle Godin, Brignoud (FR); Loris Olmos, Moidieu (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 361 days.

(21) Appl. No.: 13/898,644

(22) Filed: May 21, 2013

(65) Prior Publication Data

US 2013/0312502 A1 Nov. 28, 2013

(30) Foreign Application Priority Data

May 24, 2012 (FR) ..................... 12 54803

(51) Int. Cl.
*G01B 5/28* (2006.01)
(52) U.S. Cl.
CPC ........................................ *G01B 5/28* (2013.01)
(58) Field of Classification Search
CPC .......................................................... G01B 5/28
See application file for complete search history.

(56) References Cited

U.S. PATENT DOCUMENTS

| 6,209,217 | B1 | 4/2001 | Tsuruta et al. | |
|---|---|---|---|---|
| 7,997,126 | B2 * | 8/2011 | Kang et al. | 73/105 |

| 2006/0169023 | A1 | 8/2006 | David |
| 2012/0109541 | A1 | 5/2012 | De Boissieu et al. |
| 2012/0118080 | A1 | 5/2012 | De Boissieu et al. |

FOREIGN PATENT DOCUMENTS

| FR | 2 945 340 | | 11/2010 |
| WO | WO 2010/103102 | A1 | 9/2010 |
| WO | WO 2010/130631 | A1 | 11/2010 |

OTHER PUBLICATIONS

Calogero Maria Oddo, et al., "Artificial Roughness Encoding with a Bio-inspired MEMS-based Tactile Sensor Array", Sensors, vol. 9, No. 5, 2009, pp. 3161-3183.

(Continued)

*Primary Examiner* — Daniel S Larkin
(74) *Attorney, Agent, or Firm* — Oblon, McClelland, Maier & Neustadt, L.L.P.

(57) ABSTRACT

A method for estimating a roughness R of a surface is provided, including: measuring, during relative movement of at least one force sensor in a direction roughly parallel to the surface, at least one force $F_{ortho}$ perceived by the at least one force sensor in a direction which is roughly orthogonal to said direction of movement, and parallel to said surface; calculating at least one statistical parameter P representative of variations of the value of the measured at least one force $F_{ortho}$; and estimating the roughness R by calculating R=f(P), where f(P) is a function of the at least one statistical parameter P having at least some coefficients with values that are dependent on characteristics of the at least one force sensor used, and on a force with which the at least one force sensor is applied on said surface during the relative movement.

11 Claims, 3 Drawing Sheets

(56) References Cited

OTHER PUBLICATIONS

Figure 1:
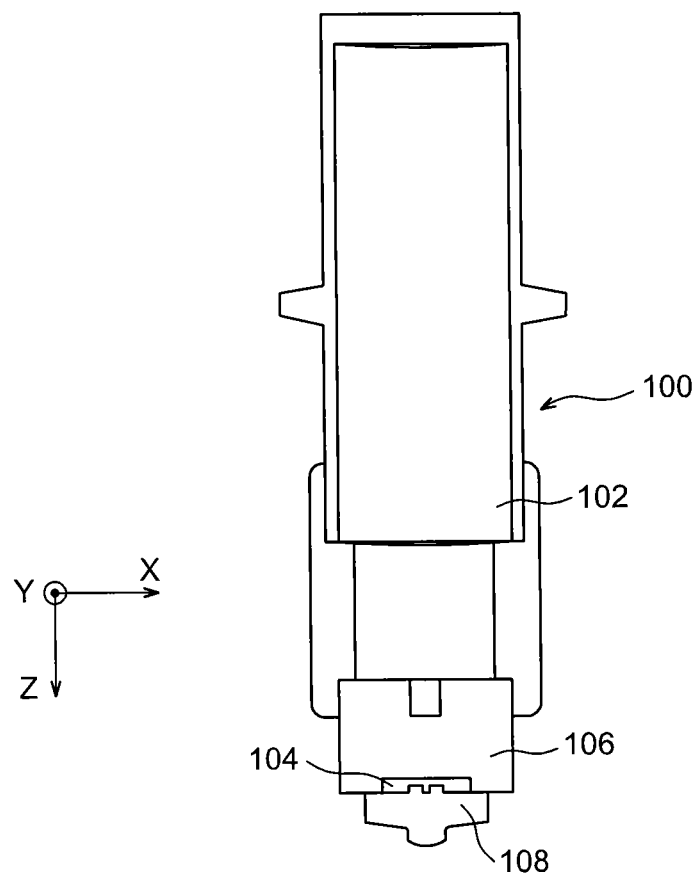

Calogero Maria Oddo, et al., "Roughness Encoding in Human and Biomimetic Artificial Touch: Spatiotemporal Frequency Modulation and Structural Anisotropy of Fingerprints", Sensors, vol. 11, 2011, pp. 5596-5615.

Gábor Vásárhelyi, et al., "Tactile sensing-processing: Interface-cover geometry and the inverse-elastic problem", Sensors and Actuators, vol. 140, 2007, pp. 8-18.

H. Zahouani, et al., "Identification of manufacturing signature by 2 D wavelet decomposition", Wear, vol. 264, 2008, pp. 480-485.

French Preliminary Search Report issued Feb. 28, 2013, in French 1254803, filed May 24, 2012 (with English Translation of Categories of Cited Documents).

Bharat Bhushan, "Methodology for Roughness Measurement and Contact Analysis for Optimization of Interface Roughness," IEEE Transactions on Magnetics, vol. 32, No. 3, XP011030203, May 1996, pp. 1819-1825.

* cited by examiner

METHOD FOR ESTIMATING A ROUGHNESS OF A SURFACE

TECHNICAL FIELD

The invention relates to a method for characterising a surface state, and in particular a method for estimating the roughness of a surface.

The method according to one embodiment of the invention applies particularly to the conduct of quality controls of surface states in the field of the paper, fabric, leather, wood, plastic or cosmetics industries. In these industries instrumental measurement of the properties, and notably the roughness, of the surfaces from a mechanical and tactile standpoint is very useful. The method according to one embodiment of the invention can be used, in particular, when designing products, to undertake roughness inspections enabling new surfaces to be developed, whilst complying with a schedule of specifications. The method according to one embodiment of the invention can also be used to check the roughness of surfaces of elements during the manufacture, in order to detect and correct any inconsistency of the surface state of the elements produced.

In the field of robotics and hand prostheses, the method according to one embodiment of the invention may also be used to recreate the sense of touch, the perception of surfaces' textures, including roughness, which play a decisive role in the sense of touch.

STATE OF THE PRIOR ART

Knowledge of the surface state, i.e. of the topology, or again of the relief, of this surface, and more specifically of the roughness of a surface, enables information to be obtained relating to the properties of this surface such as, for example, its sensitivity to corrosion and to wear and tear, or again its adherence, sliding or running properties.

In addition, roughness plays an important role in the tactile perception of a surface. Indeed, humans are capable, when touching a surface, of distinguishing different materials, shapes and surface states, and of assigning sensory properties (slippery, sticky, rough, soft, etc.) to them. The problem of artificial touch consists in seeking an equivalent instrumental measurement. Several parameters, such as the nature of the material and its surface state, are involved in this artificial tactile perception.

To determine a surface state methods exist which measure the topography of the surface under investigation, and which then extract the parameters representative of the surface state from the measured topography.

To measure the topography of the surface under investigation, mechanical contact profilometers exist, based on movement of a point (a diamond point, ball or AFM), which enable the profile of the line explored by the point to be obtained. By performing a series of sweeps the surface under investigation can be reconstituted in three dimensions. Methods also exist based on optical devices, such as interferometry or confocal microscopy, and more recently digital holographic microscopy, enabling 3D topographies to be obtained directly, and with excellent accuracy, without acting directly on the surface under investigation.

When these profiles, or 3D topographies, have been obtained the parameters representative of the surface state must be extracted from them. The often disordered nature of a surface means that it is not possible to extract directly a single parameter characterising the roughness of the surface under investigation from the topographic measurement made. Many parameters are therefore defined, which take account of the depth of the protrusions present at the surface (vertical difference between the peaks and troughs), of their widths (horizontal separation between two peaks) or indeed of their asymmetry.

These devices, whether mechanical or optical, for measuring topographical profiles have, however the disadvantages that they are bulky and costly, and that they provide no information concerning the friction properties concerning the analysed surfaces.

Document WO 2010/130631 A1 describes a method for characterising a surface using an artificial finger including a triaxial force sensor produced using MEMS technology, and encased in an elastomer. The artificial finger is moved over the surface to be characterised. This method enables an estimate to be made of the sensory tactile parameters of the surfaces under investigation, but is not suitable for producing an estimate of the roughness of a surface.

DESCRIPTION OF THE INVENTION

Thus there is a need to propose a method enabling an estimate to be made of the roughness of a surface under investigation, which does not require the use of a device for measuring topographical profiles.

To this end, one embodiment proposes a method for estimating a roughness R of a surface, including at least the following steps:

relative movement of at least one force sensor against said surface and in a direction of movement roughly parallel to said surface, i.e. included in a plane roughly parallel to said surface, measurement, during the relative movement of the force sensor relative to the surface, of at least one force $F_{ortho}$ perceived by the force sensor in a direction which is roughly orthogonal to said direction of movement, and parallel to said surface (or included in the plane roughly parallel to said surface), calculation of at least one statistical parameter P representative of the variations of the value of measured force $F_{ortho}$;

calculation of roughness R such that:

$$R = f(P),$$

where $f(\ )$ is a known function of which at least some of the coefficients have values which are dependent on the characteristics of the force sensor used, and on a force with which the force sensor is applied on said surface during the movement.

This method therefore proposes to use a tactile force sensor (for example, forming part of an artificial finger), for example a 3D force sensor of the MEMS type, to estimate roughnesses using only the component ($F_{ortho}$) of the force tangential to the surface which is orthogonal to the direction of movement of the sensor against the analysed surface. Such a force sensor is small in size and inexpensive, and also enables a combined measurement of the properties of roughness and friction of the analysed surface to be made.

This method applies both to surfaces having aligned, or positioned, roughnesses, and to surfaces having non-aligned, or non-positioned, roughnesses.

Another advantage of such a method is that it avoids the use of conventional topology-measuring devices (optical devices and feelers). In addition, with this method, there is no need to estimate the profile of the surface under investigation, which would require the reverse function of the force sensor used to be known.

This method is based in particular on the surprising effect that the variations of the force orthogonal to the direction of movement of the force sensor enable a better estimate of the roughness of the surface under investigation to be obtained than the variations of the force parallel to the direction of movement of the force sensor over the surface, which thus goes against technical assumptions in this field.

By using variations of the force orthogonal to the direction of movement of the sensor to estimate the roughness of the surface, the local variations of the adhesion and sliding properties of the material of the surface under investigation which are found in the variations of the force parallel to the direction of movement of the force sensor are avoided.

Due to the fact that statistical parameter P is representative of the variations of the value of measured force $F_{ortho}$, the latter is closely correlated to the roughness values obtained by conventional roughness measurements.

Function f( ) may or may not be a linear function. The values of the coefficients of this function may be determined beforehand by means of learning steps using one or more surfaces of known roughness.

The force sensor may be of the triaxial type. Such a force sensor enables all the components in the space of the force experienced by the force sensor to be measured, i.e. not only force $F_{ortho}$, but also a force $F_{para}$, corresponding the force parallel to the direction of movement of the force sensor, and a force $F_{normal}$, corresponding to the force normal to the surface. These additional measurements may be used to determine other properties of the surface under investigation: sliding, friction, etc.

The force sensor may include at least one deformable membrane and one rod mechanically connected to the deformable membrane. When the force sensor is moved against the surface, the force sensor may be positioned against the surface such that one axis of the rod is orthogonal to said surface, and that one of the measuring axes of the force sensor in the plane of said surface is parallel to the direction of movement of the force sensor. In such a configuration the force sensor measures directly the force orthogonal to the direction of movement of the force sensor and parallel to the surface.

Statistical parameter P may be the standard deviation, or the variance, or the variation from the mean, or the maximum amplitude of the variations of the value of measured force $F_{ortho}$, or the arithmetic average of m maximum amplitudes of the variations of the value of measured force $F_{ortho}$ taken over a length equal to 1/m of at least a portion of the length of movement of the force sensor over the surface, where m is a number greater than or equal to 2. Advantageously, m may be equal to 5.

Statistical parameter P may be calculated directly from a signal $U_Y(t)$ corresponding to a voltage outputted by the force sensor which is sampled, and then digitised, and which is representative of measured force $F_{ortho}$, or from a signal $F_{ortho}(t)=U_Y(t)/S_Y$, where $S_Y$ is the sensitivity of the force sensor in said direction roughly orthogonal to the direction of movement and parallel to the surface.

The method may also include, prior to the calculation of statistical parameter P, a step of high-pass filtering of the measurement of force $F_{ortho}$ made by the force sensor, where statistical parameter P is then calculated from the filtered measurement of force $F_{ortho}$.

Roughness R may be such that:

$$R = \alpha P + \beta$$

where $\alpha$ and $\beta$ may be coefficients the values of which are dependent on the characteristics of the force sensor used, and on a force with which the force sensor is applied on said surface during the movement.

The method may also include, prior to the calculation of roughness R, a step of estimation of the values of coefficients $\alpha$ and $\beta$ from measurements, during relative movements of the force sensor against k surfaces respectively of roughnesses $Z_k$ of known and differing values, and in a direction of movement which is roughly parallel to the k surfaces, of forces $F_{ortho\text{-}k}$ perceived by the force sensor in a direction which is roughly orthogonal to the direction of movement and parallel to the k surfaces, where k is an integer greater than or equal to 2.

The values of $\alpha$ and $\beta$ may be estimated by the use of a linear regression algorithm, by the method of least squares, from the values of the roughnesses $Z_k$ and from the values of statistical parameters $Q_k$ representative of the variations of forces $F_{ortho\text{-}k}$ perceived by the force sensor when it is moved against the k surfaces.

The relative movement of the force sensor against the surface may be made by automated mechanical means, or automated device, able to move the force sensor against the surface and/or to move the surface relative to the force sensor.

One embodiment of the invention also relates to a method for characterising a surface state, including at least the implementation of a method for estimating a roughness R of the surface as described above.

This method may include in particular a determination of other properties of the surface under investigation (sliding, friction, etc.), for example using the measurement of force $F_X$, or $F_{para}$, corresponding to the force parallel to the direction of movement of the force sensor and/or of force $F_Z$, or $F_{normal}$, corresponding to the force normal to the surface.

BRIEF DESCRIPTION OF THE ILLUSTRATIONS

Figure 2:
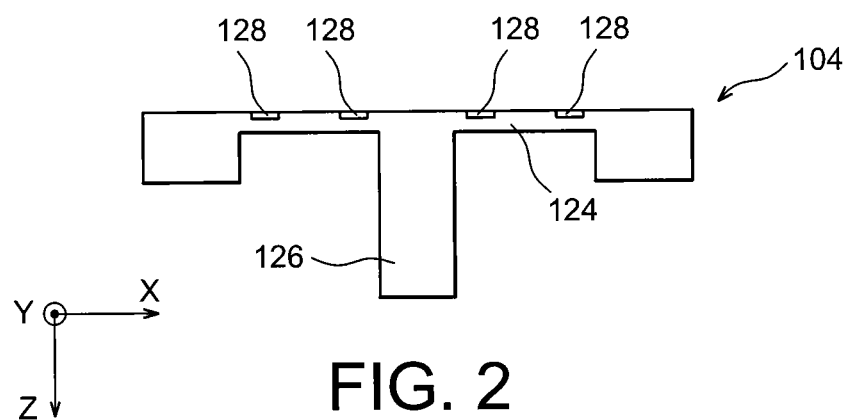
Figure 3:
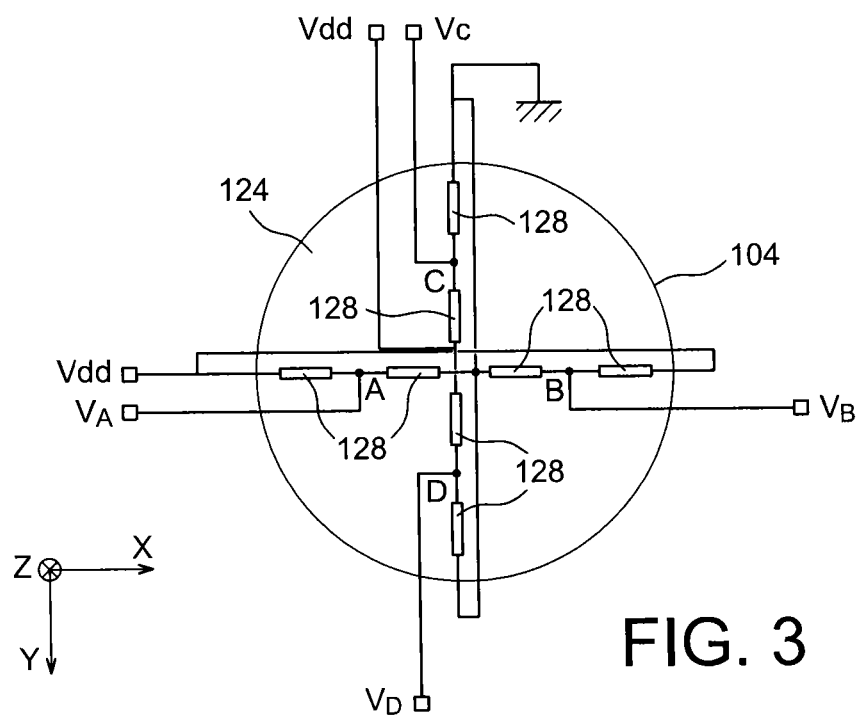
Figure 4:
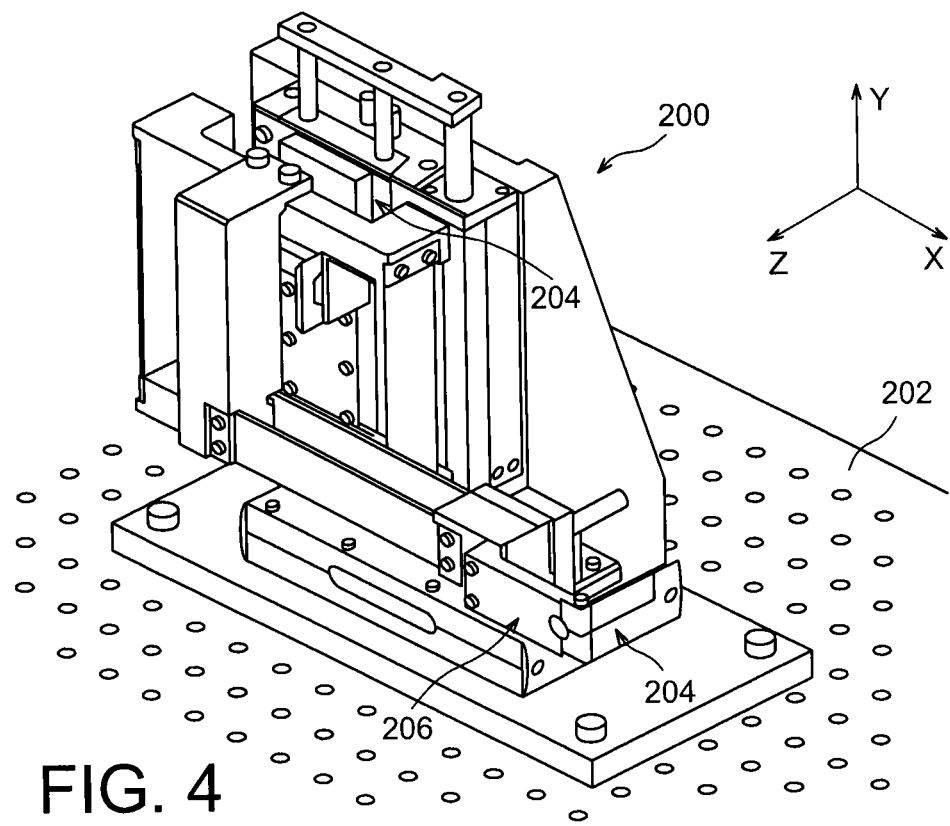
Figure 5:
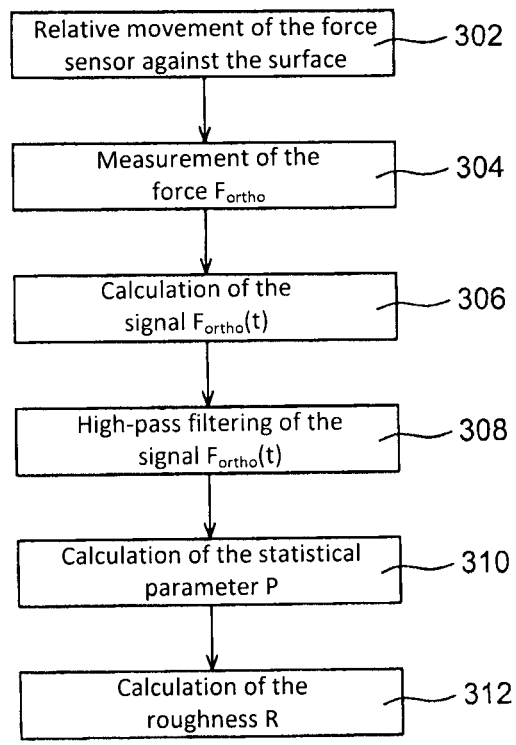
Figure 6:
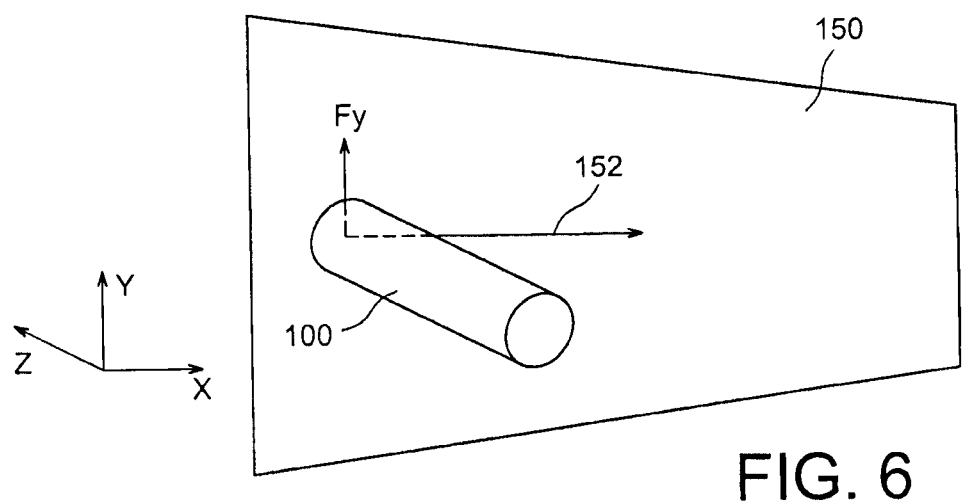

The present invention will be better understood on reading the description of example embodiments given purely as an indication and in no sense restrictively, making reference to the appended illustrations in which:

FIG. 1 represents a device for characterising a surface fitted with a force sensor used during a method for estimating a roughness of a surface according to a particular embodiment, FIGS. 2 and 3 represent respectively a profile section view and a top view of a force sensor used during a method for estimating a roughness of a surface according to a particular embodiment, FIG. 4 represents an example embodiment of a device for exploring a surface which may be used to implement a method for estimating a roughness of a surface according to a particular embodiment, FIG. 5 is a diagram representing the steps of a method for estimating a roughness of a surface according to a particular embodiment, FIG. 6 represents the movement of a device for exploring a surface against a surface of which it is sought to estimate the roughness through the use of a method for estimating a roughness of a surface according to a particular embodiment.

Identical, similar or equivalent parts of the various figures described below have the same numerical references, to make it easier to move from one figure to another.

The various parts represented in the figures are not necessarily represented at a uniform scale, in order to make the figures more readable.

The various possibilities (variants and embodiments) must be understood as not being mutually exclusive, and being able to be combined with one another.

DETAILED DESCRIPTION OF PARTICULAR EMBODIMENTS

Reference is firstly made to FIG. 1, which represents a device for characterising a surface 100 fitted with a force sensor 104 used during a method for estimating a roughness R of a surface according to a particular embodiment.

Device 100 is an artificial finger including a gripper body 102. Device 100 is fitted with a force sensor 104, which in this case is a triaxial force sensor 104 of the MEMS (Micro-Electro-Mechanical System) type. Force sensor 104, represented in detail in FIG. 2, includes a deformable membrane 124, which is for example circular in shape, and a rod 126 mechanically connected to the centre of membrane 124. Rod 126 has, for example, a cylindrical shape of axis parallel to axis Z of the orthogonal marker (X, Y, Z) represented in the figures.

Membrane 124 and rod 126 are, for example, made from the same single crystal silicon. Rod 126 is embedded in an encasing structure 108 made of elastomer covering force sensor 104, and which protects force sensor 104 by this means.

Encasing structure 108 comprises, for example, polyurethane of the LOCTITE 3957 type having a hardness of 80 Shore A, thus being comparable with the mechanical properties (such as the viscoelasticity) of natural skin, whilst remaining sufficiently hard to prevent excessively rapid wear and tear of encasing structure 108 due to the repeated measurements made by device 100. In addition, force sensor 104 is recessed in one face of a flat support 106 comprising a hard material, for example epoxy, which is coupled with body 102.

When device 100, or more accurately the end of encasing structure 108, is rubbed against a surface which it is sought to characterise, the forces to which encasing structure 108 is subject are transmitted to rod 126, which deforms membrane 124, these forces corresponding to the force perceived by force sensor 104 when device 100 is moved against the surface under investigation. The deformation of membrane 124 by rod 126 is then measured by transduction means, for example piezoresistive strain gauges or capacity variation detectors, positioned on membrane 124, and which output one or more signals representing the force perceived by force sensor 104.

As represented in the example of FIG. 3 (which is a top view of force sensor 104), the transduction means of force sensor 104 may be eight piezoresistive strain gauges 128 (where their resistances vary according to the mechanical deformations to which they are subject), for example produced by localised doping in membrane 124, and positioned on two perpendicular axes in the plane of membrane 124 (a plane parallel to plane (X,Y)) and interconnected electrically, forming two Wheatstone bridges around rod 126. When at rest all gauges 128 have a resistance of the same value, but the deformation of membrane 124 caused by the change of alignment of rod 126 due to the forces to which force sensor 104 are subject will compress or stretch the different gauges 128, and by this means cause their electrical resistances to vary.

When encasing structure 108 of device 100 is moved against a surface to be characterised this movement creates a force perceived by force sensor 104. Gauges 128 are then compressed or stretched, creating an imbalance of mid-points A, B, C and D, which are the connection points between two gauges 128 positioned along a given axis. In the example described here, force sensor 104 is positioned such that an axis of rod 126 is orthogonal to the characterised surface. In addition, one of the measuring axes of force sensor 104 (corresponding to one of the axes with which the gauges are aligned, corresponding to axes X and Y represented in FIG. 3) in the plane of the surface to be characterised is parallel to the direction of movement of force sensor 104. By measuring the differences at these points three voltages $U_X$, $U_y$ and $U_z$ may be obtained which are related, by a proportionality relationship, to the three components $F_{para}$, $F_{ortho}$ and $F_{normal}$ of the force perceived by force sensor 104 respectively along axes X, Y and Z represented in the figures, due to the fact that one of the measuring axes (axis X) of the force sensor in the plane of the surface under investigation is parallel to the direction of movement of force sensor 104. Component $F_{normal}$ is the force normal to the surface under investigation perceived by force sensor 104. Component $F_{para}$ is the force perceived by force sensor 104 in the axis of movement of device 100 on the surface under investigation. Finally, component $F_{ortho}$ is the force perceived by force sensor 104 in the direction orthogonal to the direction of movement of device 100 on the surface under investigation, in a plane parallel to this surface.

This specific connection of gauges 128 with two Wheatstone bridges therefore enables the three components $F_{para}$, $F_{ortho}$ and $F_{normal}$ of the force perceived by force sensor 104 to be measured independently. To accomplish this, potentials $V_A$, $V_B$, $V_c$ and $V_D$ are recovered and preprocessing is undertaken with an electronic unit of the sensor (not represented), which enables the following three voltages to be obtained as measurements representative of the three components $F_{para}$, $F_{ortho}$ and $F_{normal}$:

$$U_X = V_B - V_A = S_X \cdot F_{para}$$

$$U_Y = V_C - V_D = S_Y \cdot F_{ortho}$$

$$U_Z = (V_A + V_B) - (V_C + V_D) = S_Z \cdot F_{normal}$$

$S_X$, $S_Y$ and $S_Z$ are the sensitivities of force sensor 104 along each axes X, Y and Z.

For example, in the case of a force sensor 104 comprising single crystal silicon, including a membrane 124 of diameter equal to approximately 2 mm, and which is approximately 60 μm thick, and a rod 126 of diameter equal to approximately 750 μm, sensitivities $S_X$ and $S_Y$ of force sensor 104 are equal to approximately $200 \pm 10$ mV·N$^{-1}$, and sensitivity $S_Z$ of force sensor 104 is equal to $51 \pm 2$ mV·bar$^{-1}$.

To be able to move device 100, automatically and accurately, over the surface to be investigated, this device is coupled with a surface exploration device 200, one example embodiment of which is represented in FIG. 4, enabling device 100 to be moved against the surface under investigation which is positioned on a support, not represented, facing device 100. As a variant it would be possible to have a surface exploration device moving the surface to be investigated against device 100 which could be held stationary. It is also possible to have the surface to be characterised and device 100 both moving relative to one another. The advantages of such a device 200 are that it allows a large number of types of surfaces to be analysed, and allows meticulous control of the method's implementation settings such as, for example, that of the forces applied to device 100 (i.e., the force with which device 100 is pressed against the surface under investigation), or again that of the speed of movement of device 100 against the surface under investigation. Device 200 is placed on an anti-vibration surface 202 in order not to disturb the method in the event of external vibratory disturbance.

The support of the surface under investigation may be made of stainless steel, and may include, for example, magnets which may help hold one or more surfaces to be investigated. This support has, for example, two possible states: advanced or retracted. These states are reached, for example, with a double-acting cylinder which may or may not be activated, which enables the surface to be investigated to be put in contact with device 100, or to be removed. A damper enables the impact to be reduced when the surface under investigation and device 100 are brought into contact, to prevent damage to force sensor 104 and/or to encasing 108. To adjust the normal force (in axis Z) with which device 100 is pressed against the surface under investigation, this surface is brought into contact with device 100, and its position in axis Z is then adjusted accurately, for example using a micrometer screw.

Device 200 includes two motors 204 which enable an arm 206 to be moved, to the end of which device 100 is attached, in two orthogonal directions of a plane parallel to the surface under investigation (one allowing horizontal movement of device 100, parallel to axis X, and the other allowing vertical movement of device 100, parallel to axis Y).

A method for estimating roughness R of a surface 150 according to a particular embodiment, implemented with previously described devices 100 and 200, is now described in connection with FIGS. 5 and 6.

As represented in FIG. 6, device 100 is firstly positioned against surface 150 using previously described surface exploration device 200. Encasing structure 108 of device 100 is then rubbed against surface 150 whilst moving device 100 horizontally, i.e., parallel to axis X (where the surface under investigation is positioned in a plane parallel to plane (X,Y)), for example with an exploration speed equal to approximately 5 mm/s. In FIG. 6 the direction of movement of device 100 is shown symbolically by a horizontal arrow referenced 152. Device 100 could be moved in a different manner against the surface under investigation. In this case it is considered that axis X is still the direction of movement of device 100 on surface under investigation 150.

During this movement (step 302), device 100 is positioned orthogonally to surface under investigation 150, i.e. such that the axis of rod 126 (parallel to axis Z as represented in FIG. 2) of force sensor 104 is orthogonal to the plane of surface 150 (which is parallel to plane (X,Y)). The components of the force perceived by force sensor 104 when it moves against surface 150 are thus indeed components $F_{para}$ and $F_{orth}$, of this force in the plane of surface under investigation 150 and component $F_{normal}$ normal to surface 150. It may also be envisaged not to have device 100 positioned orthogonally to surface 150 when it is moved against this surface 150. However, in this case the alignment of device 100 in space should be known with accuracy, in order that components $F_{para}$, $F_{ortho}$ and $F_{normal}$ of the force perceived by sensor 104 in the axes of marker orthogonal (X,Y,Z) may be able to be found subsequently with surface 150 positioned parallel to plane (X,Y). This case may lead to a lesser measuring accuracy, since $F_{ortho}$ calculated in this manner may be subject to perturbations.

The force with which device 100 is applied against surface 150 may be modified, in particular in order to compensate for any flatness defects of surface 150, and to prevent, for example, any discontinuity of contact between device 100 and surface 150 as it is being explored. This initial normal force is equal, for example, to approximately 0.5 N. During the exploration of the surface under investigation this normal force may vary between approximately 0.2 N and 1.2 N due to the flatness defects of this surface 150.

When device 100 is moved against surface 150, the forces caused by the roughnesses of surface 150 are transmitted to rod 126 which deforms membrane 124 of force sensor 104. For the entire time device 100 is being moved force $F_{ortho}$ perceived by force sensor 104 is measured (step 304). This measurement is equal to voltage $U_Y$ outputted by force sensor 104. Only voltage $U_Y$, i.e. the signal outputted by sensor 104 which is proportional to force $F_{ortho}$ (in the direction parallel to surface under investigation 150 and orthogonal to direction of movement 152 of device 100) perceived by sensor 104 will be used in the remainder of the method to determine roughness R of the surface under investigation. Measurement of $F_{ortho}$ alone is an element of information relating solely to the topology of surface under investigation 150, and which is not distorted by the local variations of the adhesion and sliding properties of the materials of surface 150 and of encasing 108, unlike signal $U_X$, which is equal to the measurement of force $F_{para}$ perceived by sensor 104 in the direction of movement 152 of sensor 104. The variations of the values of signal $U_Y$ derive in particular from the stresses caused by the troughs and protrusions lateral to the axis of movement of device 100 over surface 150, which are elements representative of the roughness of surface 150 which it is sought to characterise. In addition, any variations of the normal force of device 100 against surface 150 (in axis Z) have no impact on the measurement of $F_{ortho}$ made, which is independent of this force. A large evaluation length is properly chosen in order to produce the best possible results.

Although voltage $U_Y$ alone is used to determine roughness R of surface 150, sensor 104 also outputs voltages $U_X$ and $U_Z$, whilst surface 150 is being explored.

These signals can be used during this method: for example, the period during which device 100 moves against surface 150 may be determined accurately by detecting fronts in signal $U_X$ which, for example, enables the portions of signal $U_Y$ which are outputted by sensor 104, while the latter is not yet moving against surface 150, to be eliminated easily.

Voltage $U_Y$, which is measured whilst device 100 is moving against surface 150, is sampled (for example at a sampling frequency of approximately 10 KHz), digitised and recorded, for example by means of an acquisition card (not represented).

This voltage then forms a time signal $U_Y(t) = \{U_{Y1}, \ldots, U_{Yi}, \ldots, U_{Yn}\}$, in this case comprising n samples.

As previously mentioned, there is the relationship $U_Y = S_Y \cdot F_{ortho}$. Bearing in mind that the value of $S_Y$ is known a signal $F_{ortho}(t)$, also comprising of n samples, may therefore be calculated directly from signal $U_Y(t)$, such that $F_{ortho}(t) = U_Y(t)/S_Y$ (step 306).

A high-pass filtering of signal $F_{ortho}(t)$ is then applied to centre the values of the samples around zero and to delete the coarse variations of this signal, which correspond to the shape defects and undulations of surface 150, and not to the roughnesses which it is sought to characterise (step 308). This filtering may be accomplished with a cut-off wavelength equal to approximately $\frac{1}{5}^{th}$ the evaluation length, i.e., the length over which device 100 is rubbed on surface 150. A cut-off wavelength equal to approximately 2.5 mm may be chosen, corresponding to a cut-off frequency of approximately 2 Hz for a speed of movement of device 100 over surface 150 equal to approximately 5 mm/s.

From filtered signal $F_{ortho}(t)$, a statistical parameter P is calculated which is representative of the variations of values of signal $F_{ortho}(t)$ (step 310). This statistical parameter P of $F_{ortho}(t)$ may be the standard deviation $\sigma$ of the n samples of signal $F_{ortho}(t)$, defined according to the following equation:

$$\sigma(F_{ortho}(t)) = \sqrt{\frac{1}{n}\sum_{i=1}^{n}\left(F_{ortho-i} - \overline{F}_{ortho}\right)^2}$$

where $F_{ortho-i}$ is each of the n samples of $F_{ortho}(t)$ and $\overline{F}_{ortho}$ is the arithmetic mean of the n samples of $F_{ortho}(t)$ defined according to the following equation:

$$\overline{F}_{ortho} = \frac{1}{n}\sum_{i=1}^{n} F_{ortho-i}$$

In a variant, statistical parameter P may be the variance $\sigma^2$ of the n samples of $F_{ortho}(t)$, defined according to the following equation:

$$\sigma(F_{ortho}(t)) = \frac{1}{n}\sum_{i=1}^{n}\left(F_{ortho-i} - \overline{F}_{ortho}\right)^2$$

In another variant, statistical parameter P may be the variation from the mean of the n samples of $F_Y(t)$, defined according to the following equation:

$$avdev(F_{ortho}(t)) = \frac{1}{n}\sum_{i=1}^{n}\left|F_{ortho-i} - \overline{F}_{ortho}\right|$$

This variation from the mean avdev $(F_{ortho}(t))$ may be comparable to the arithmetical mean deviation of the surface roughness, generally called Ra.

In another variant, statistical parameter P may be the maximum amplitude of $F_{ortho}(t)$, equal to: $\max(F_{ortho}(t)) - \min(F_{ortho}(t))$, where $\max(F_{ortho}(t))$ is the maximum value of $F_{ortho}(t)$ and $\min(F_{ortho}(t))$ is the minimum value of $F_{ortho}(t)$.

Finally, in another variant, statistical parameter P may be the average roughness depth, noted $R_z$, which is the arithmetic mean of the largest separate roughness depths of different contiguous measuring segments. $R_z$ may be the arithmetic mean of the five maximum amplitudes taken over a base length equal to $\frac{1}{5}^{th}$ the surface exploration length (i.e., the length over which device 100 is moved on the surface under investigation), and may be defined according to the following equation:

$$R_Z(F_{ortho}(t)) = \frac{1}{5}\sum_{i=1}^{5}\left[\max(F_{ortho-t}) - \min(F_{ortho-t})\right]_{t=(i-1)\frac{n}{5}\text{ à }i\frac{n}{5}\text{ ortho-}t}$$

corresponding to the $t^{th}$ sample of $F_Y(t)$.

Statistical parameter P is derived from time signal $F_{ortho}(t)$, which is itself obtained from time signal $U_Y(t)$. Indeed, the roughnesses do not necessarily have particular periodicities (except in the case of aligned roughnesses), and no characteristic line would be apparent in a frequency spectrum of $F_{ortho}(t)$ or $U_Y(t)$.

There are also other statistical parameters, such as the arithmetic or harmonic mean, the median, the mode, the skewness, the kurtosis, or again the minimum or maximum value.

However, the five statistical parameters given above (standard deviation, variance, variation from the mean, maximum amplitude and average roughness depth Rz) are the most representative ones to estimate roughness R, due to the fact that they allow improved differentiation between surfaces of different roughnesses. In addition, compared to the other statistical parameters, these five parameters have a linear relationship between their values and the corresponding roughness value. These properties are due to the fact that these five parameters are relative to the variations of values of signal $F_{ortho}(t)$ or $U_Y(t)$, i.e. to the dispersion of the measured values of force $F_{ortho}$, unlike the statistical parameters relative to the average values, and unlike other properties, such as the flattening or asymmetry of a series of values. In addition, among these five statistical parameters, statistical parameter P is preferably standard deviation $\sigma$, which is the parameter from which it is possible to make the best estimate of roughness R. Statistical parameter P is advantageously a statistical parameter representative of the variations of values of $F_{ortho}(t)$ or $U_Y(t)$.

In addition, given that this statistical parameter P is calculated from force $F_{ortho}$ orthogonal to the direction of movement of force sensor 104, and not from component $F_{para}$ parallel to the direction of movement of sensor 104, this parameter P is therefore independent of the normal force with which device 100 is applied against surface 150, and of the friction coefficient of device 100 against surface 150.

In the example described above, statistical parameter P is calculated from filtered signal $F_{ortho}(t)$, and this parameter can therefore be noted $P(F_{ortho}(t))$. As a variant, statistical parameter P may be calculated directly from signal $U_Y(t)$, corresponding in this case to $P(U_Y(t))$, meaning that there is no longer any requirement to calculate $F_{ortho}(t)$, or requirement for calibration, in order to determine sensitivity $S_Y$ of sensor 104. In addition, the method may be simplified by not carrying out the high-pass filtering of signal $F_{ortho}(t)$ or of signal $U_Y(t)$, to the detriment, however, of a less correct estimate of roughness R which will be calculated subsequently.

In order to increase the accuracy of the estimate of roughness R from statistical parameter P, it is possible, when calculating P, to eliminate the samples of signal $F_{ortho}(t)$ (or of signal $U_Y(t)$) for the first and last millimeters (for example the first two and the last two millimeters) of surface 150 explored by device 100 which may be disturbed by the acceleration and deceleration of motors 204 of device 200.

Using statistical parameter P obtained, an estimated roughness R of surface 150 is then calculated (step 312) by:

$$R=f(P)$$

Relation f( ) is advantageously a linear relationship, such as:

$$R=\alpha P+\beta$$

where $\alpha$ and $\beta$ are coefficients the values of which depend on the characteristics of used force sensor 104 and on the normal force with which sensor 104 is applied against surface 150. The values of coefficients $\alpha$ and $\beta$ are known, or determined beforehand by learning.

Roughness R calculated in this manner is closely representative of the depths and heights of the troughs and protrusions present on surface under investigation 150.

When the values of coefficients $\alpha$ and $\beta$ are not known, for example when force sensor 104 has not yet been used to make an estimate of the roughness of a surface, these values will be estimated by learning before estimating roughness R of surface 150. This learning phase is preferably implemented before the previously described steps relating to the estimate of roughness R.

This learning phase is implemented from k reference surfaces, the roughnesses of which, noted $Z_k$, are known and different, where k is an integer greater than or equal to two. As with the surface to be characterised, signals $U_{yk}(t)$ obtained during one or more passes of device 100 against the surfaces of the samples of known roughnesses $Z_k$ are first measured. The number of passes over the same surface is noted j and is presumed to be identical for each of the explored surfaces. The higher the number of surfaces k and of passes j, the more robust is the learning process.

Statistical parameters $Q_k$, which are representative of the variations of signals $U_{Yk}(t)$ (or of signals $F_{ortho-k}(t)$ calculated from signals $U_{Yk}(t)$), being for example the standard deviation, the variance, the variation from the mean, the maximum amplitude or again the average roughness depth, are then calculated from the signals obtained with these surfaces of known roughnesses $Z_k$. To calculate values $\alpha$ and $\beta$, a linear regression algorithm is then implemented by the least squares method, between the values of statistical parameters $Q_k$ (which, for this calculation, are put in the form of vectors of e elements noted respectively $q_{k \cdot j}$, where $e=k \times j$ for each of the j passes over the k surfaces) and associated roughnesses $Z_k$ which are known. The values of $\alpha$ and $\beta$ which minimise the square of the errors between each of known roughnesses $Z_k$ (which, for this calculation, are put in the form of a vector of e elements noted $z_e$), and an estimated roughness $\tilde{Z}$ (in the form of a vector of estimated roughnesses $\tilde{z}_e$) are therefore sought.

Due to the fact that $\tilde{Z}=\alpha \cdot Q + \beta$, the minimisation of the square of the errors between known roughnesses $Z_k$ and estimated roughnesses $\tilde{Z}_k$ is therefore equivalent to minimising the following sum:

$$\sum_{i=1}^{e} (z_i - \alpha q_i - \beta)^2$$

The values of $\alpha$ and $\beta$ are therefore equal to:

$$\alpha = \frac{\sigma_{QZ}}{\sigma_Q^2} \text{ and } \beta = \overline{Z} - \alpha \overline{Q}$$

where $\sigma_{QZ}$: covariance between Q and Z;
$\sigma_Q^2$: variance of Q.

In one variant, several passes of force sensor 104 against surface 150 to be characterised may be made, where statistical parameter P is in this case calculated from all the measurements of $U_Y(t)$ (or of $F_{ortho}(t)$) of the different passes of sensor 104 over surface 150. Such a variant enables some sporadic defects of the signals which may appear in a single pass of force sensor 104 against surface 150 to be attenuated. In addition, the estimate of roughness R can be improved further by calculating statistical parameter P from measurements obtained by several passes of sensor 104 over different areas of surface 150. These variants can advantageously be implemented by using a matrix of several devices 100, where each is fitted with a force sensor similar to sensor 104, enabling several measurements to be made simultaneously in different areas of surface under investigation 150. This device matrix 100 may be positioned at the end of arm 206, which may therefore move all devices 100 simultaneously, at the same speed and in the same direction.

In the method described above, device 100 is moved against surface 150 by surface exploration device 200, providing precise and automated movement of device 100 against surface 150. As a variant, it is however possible to move device 100 against surface 150 by hand. In this case the operator must ensure that he moves device 100 parallel to axis X of force sensor 104 in order that voltage $U_Y$ outputted by force sensor 104 is indeed equal to the force orthogonal to the direction of movement of force sensor 104. Device 100 will also be held perpendicularly to surface 150 by the operator. Such manual handling is, for example, envisaged when the surface to be studied is not flat and is of difficult access for device 200.

Although the roughness is calculated only from force $F_{ortho}$ perceived by force sensor 104 in a direction orthogonal to the direction of movement of sensor 104 and parallel to surface 150, obtained via voltage $U_Y$ outputted by force sensor 104 when device 100 is correctly positioned orthogonally to surface 150 and moved in direction X of sensor 104, voltages $U_X$ and $U_Z$ outputted by force sensor 104 may be used to calculate other properties of surface 150. In this way, voltage $U_Z$ may be used to estimate the pressure of device 100 against surface 150, while voltage $U_X$ may be used to estimate the friction between device 100 and surface 150, by means of a calculation of the friction coefficient, which is defined as the ratio between $F_{para}$ (proportional to $U_X$) and $F_{normal}$ (proportional to $U_Z$ and constant for a perfectly flat surface). Due to the fact that, by virtue of the measurement of $F_{ortho}$, a value is obtained which is related only to the topology of surface 150, and that from the measurement of $F_{para}$ a value may be obtained related both to the topology of surface 150 and to the contact properties of surface 150, the influences of the topology and of surface contact 150 can be separated. The measurement of force $F_{normal}$ may also be used to separate the influence of pressure with regard to these contact properties.

To improve the obtained linear regression, the roughnesses of the surfaces may be measured more accurately in order to determine the real roughness with each exploration (not averaged over several areas), which amounts to refining vector Z.

Roughness parameters other than Rz may thus be obtained, which can be better correlated with some parameters taken from the roughness measurement signals. It is also possible to extract roughness measurement signals from the more complex parameters, for example after decompositions into wavelets.

As a variant of the previously described example, it is possible for relationship f( ) relating roughness R to statistical parameter P not to be a linear relationship, but instead a non-linear relationship, for example corresponding to a polynomial, logarithmic or exponential model. It is, for example, possible for roughness R to be related to statistical parameter P by one of the following relationships:

$$R = \alpha_0 + \alpha_1 P + \alpha_2 P^2$$

$$R = \alpha \cdot \log(\delta \cdot P) + \beta$$

$$R = \alpha \cdot e^{\delta \cdot P} + \beta$$

In all cases the values of the coefficients of such a non-linear relationship may be determined by learning, using non-linear regression.

The invention claimed is:
1. A method for estimating a roughness R of a surface, comprising:

performing relative movement of at least one force sensor against said surface and in a direction of movement roughly parallel to said surface;

measuring, during the relative movement of the at least one force sensor relative to the surface, at least one force $F_{ortho}$ perceived by the at least one force sensor in a direction which is roughly orthogonal to said direction of movement, and parallel to said surface;

calculating at least one statistical parameter P representative of variations of the value of the measured at least one force $F_{ortho}$; and estimating the roughness R by calculating R=f(P), where f(P) is a function of the at least one statistical parameter P having at least some coefficients with values that are dependent on characteristics of the at least one force sensor used, and on a force with which the at least one force sensor is applied on said surface during the relative movement.

2. The method according to claim 1, in which the at least one force sensor is of the triaxial type.

3. The method according to claim 1, in which the at least one force sensor includes at least one deformable membrane and one rod mechanically connected to the at least one deformable membrane and in which, when the at least one force sensor moves relatively against the surface, the at least one force sensor is positioned such that one axis of the rod is orthogonal to said surface and such that one of the axes of measurement of the at least one force sensor in a plane of said surface is parallel to the direction of movement of the at least one force sensor.

4. The method according to claim 1, in which the at least one statistical parameter P is the standard deviation, or the variance, or the variation from the mean, or the maximum amplitude of the variations of the value of the measured at least one force $F_{ortho}$, or the arithmetic average of m maximum amplitudes of the variations of the value of the measured at least one force $F_{ortho}$ taken over a length equal to 1/m of at least a portion of a length of movement of the at least one force sensor over the surface, where m is a number greater than or equal to 2.

5. The method according to claim 1, wherein the calculating the at least one statistical parameter P further comprises calculating the at least one statistical parameter P directly from a signal $U_y(t)$ corresponding to a voltage outputted by the at least one force sensor, which is sampled, and then digitised, and which is representative of the measured at least one force force $F_{ortho}$, or from a signal $F_{ortho}(t)=U_y(t)/S_y$, where $S_y$ is a sensitivity of the at least one force sensor in said direction roughly orthogonal to the direction of movement and parallel to the surface.

6. The method according to claim 1, further comprising, before the calculating the at least one statistical parameter P, high-pass filtering of the measured at least one force $F_{ortho}$ made by the at least one force sensor, where the at least one statistical parameter P is then calculated from the filtered measured at least one force $F_{ortho}$.

7. The method according to claim 1, in which the roughness R is estimated by calculating f(P)=αP+β, where α and β are coefficients, values of which are dependent on the characteristics of the at least one force sensor used, and on the force with which the at least one force sensor is applied on said surface during the relative movement.

8. The method according to claim 7, further comprising, before the estimation of the roughness R, estimating the values of coefficients α and β from measurements, during the relative movement of the at least one force sensor against k surfaces, respectively, of roughnesses $Z_k$ of known and differing values, and in a direction of movement that is roughly parallel to the k surfaces, of forces $F_{ortho-k}$ perceived by the at least one force sensor in a direction that is roughly orthogonal to the direction of movement and parallel to the k surfaces, where k is an integer greater than or equal to 2.

9. The method according to claim 8, wherein the estimating the values of coefficients α and β from measurements further comprises estimating the values of coefficients α and β by using a linear regression algorithm, by using the method of least squares, from values of the roughnesses $Z_K$, and from values of statistical parameters $Q_k$ representative of variations of forces $F_{ortho-k}$ perceived by the at least one force sensor when it is moved against the k surfaces.

10. The method according to claim 1, in which the relative movement of the at least one force sensor against the surface is performed by an automated device configured to move the at least one force sensor against the surface and/or to move the surface relative to the at least one force sensor.

11. A method for characterising a surface state of a surface having a roughness R, comprising performing the method for estimating the roughness R of the surface according to claim 1.

* * * * *